Oct. 4, 1966 E. R. BRIGHAM 3,277,398

FREQUENCY MODULATION SYSTEMS

Filed Sept. 4, 1962

INVENTOR

Eric Richard Brigham

BY Baldwin & Wight

ATTORNEYS

United States Patent Office 3,277,398

Patented Oct. 4, 1966

3,277,398

FREQUENCY MODULATION SYSTEMS

Eric Richard Brigham, Essex, England, assignor to The Marconi Company Limited, a British company Filed Sept. 4, 1962, Ser. No. 221,055
Claims priority, application Great Britain, Nov. 23, 1961, 41,963/61
7 Claims. (Cl. 332—27)

Figure 1:
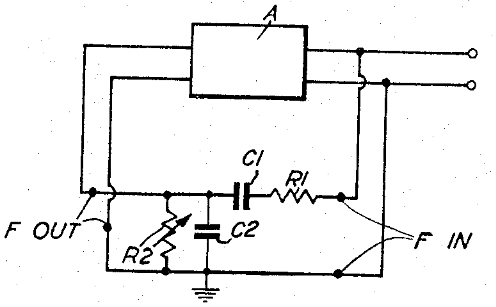

This invention relates to frequency modulation systems and more particularly, though not exclusively, to frequency modulation systems of the frequency shift type, i.e. the type in which a generated oscillation is alternated between two predetermined values of frequency in accordance with signals to be transmitted. Frequency shift frequency modulation systems are well known and in wide use, for example for the transmission of binary coded data signals over carrier telephone channels by employing keyed direct current signals to shift audio tones in frequency.

The present invention seeks to provide improved frequency modulation systems which will satisfy to a high degree the following requirements, viz: (1) good frequency stability of the limiting frequencies between which the frequency is varied in order to avoid distortion resulting from lack of such stability; (2) smooth transition from one limiting frequency to the other (in the case of a frequency shift system) in order to avoid the "key-clicks" and discontinuities in carrier waveform which occur if there is instantaneous switching from one limiting frequency to the other; and (3) freedom from the amplitude modulation which, in many known modulation systems, accompanies the frequency modulation.

According to this invention in its broadest aspect a frequency modulation system comprises a resonant tuned amplifier, a phase-shifting feedback path across said amplifier, the gain of said amplifier being such that it generates sustained oscillations by virtue of the feedback path, and means, controlled by modulating signals, for varying the phase shift in said feedback path to vary between predetermined limits the frequency generated.

According to a feature of this invention a frequency shift frequency modulation system comprises a resonant tuned amplifier, a phase shifting feedback path across said amplifier, the gain of said amplifier being such that it generates sustained oscillations by virtue of the feedback path, and means controlled by modulation signals for controlling the phase shift in said feedback path between one and another of two values, at one of which the total phase shift round the loop constituted by the amplifier and feedback path is 360° at one predetermined limiting frequency and at the other of which the said total phase shift is 360° at another predetermined limiting frequency.

Preferably the resonant tuned frequency of the amplifier is mid-way between the two limiting frequencies.

In the preferred embodiments of the invention the feedback path is constituted by a Wien bridge network having a modulating-signal-controlled variable impedance in a shunt arm thereof, the phase shift introduced by said feedback path being substantially zero at the frequency at which the amplifier is resonant.

The variable impedance is preferably constituted by a resistance network comprising resistance elements and associated switching transistors, the conductivities of which are selectively controlled by the modulating signals to control, to one or the other of two predetermined values, the overall resistance presented by the said resistance network.

Preferably again the amplifier includes an emitter follower transistor stage, an amplitude limiting transistor stage and a resonant tuned transistor stage tuned by inductance and capacity. Such an amplifier has high input impedance and low output impedance.

It is important, for the maintenance of frequency stability, that the oscillatory waveform generated shall be as free as possible from harmonics. Because the amplifier is a resonant tuned amplifier, it does not call for inconveniently accurate control of its gain in order to keep the harmonic content low.

One important advantage arising from the use of a Wien bridge network for the feedback path is that (as may be shown) the attenuation of such a network is theoretically only 3 db. at the frequency at which the phase shift it introduces is zero.

Figure 2:
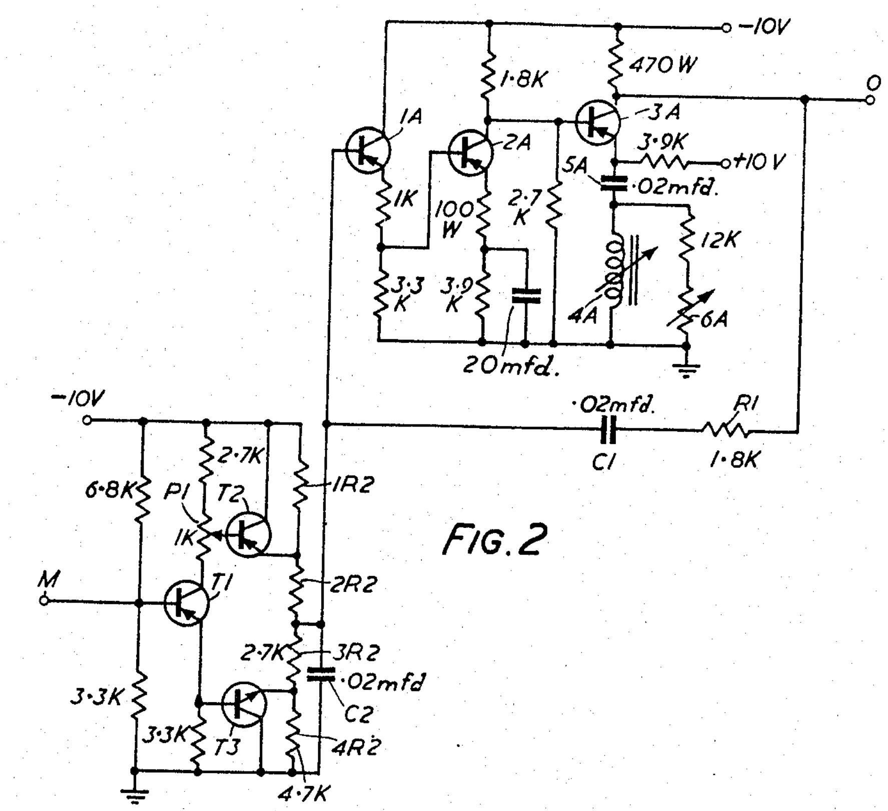

The invention is illustrated in the accompanying drawings in which FIGURE 1 is a highly simplified diagram illustrative of the principle of the invention and FIGURE 2 is a circuit diagram of a preferred embodiment.

Referring to FIGURE 1, an amplifier A has its output connected to its input through a feedback path in the form of a Wien bridge network and comprising resistances R1 and R2 and condensers C1 and C2. The resistance R2 is varied between predetermined limits by modulating signals by means not shown in FIGURE 1. The amplifier A is a resonant tuned amplifier. The Wien bridge network is so designed and dimensioned that, at the resonant frequency of the amplifier, the phase shift in the feedback path, i.e. between the points marked FIN and FOUT in FIGURE 1, is zero. At one extreme limiting value of the resistance R2, the total phase shift round the loop constituted by the amplifier and the feedback path is 360° at a predetermined limiting frequency on one side of the resonant frequency of the amplifier; at the other extreme limiting value of resistance R2, the said total phase shift is 360° at another predetermined limiting frequency substantially equally spaced on the other side of the resonant frequency. In the case of a frequency shift modulation system the value of the resistance R2 is alternated between its extreme limiting values by the modulating signals, one value corresponding to "mark" and the other to "space." It will be observed that one terminal of the modulating resistance R2 is earthed—a considerable convenience from the point of view of embodying the theoretical circuit of FIGURE 1 in a practical circuit.

FIGURE 2 shows, with considerably more detail than FIGURE 1, a preferred form of frequency shift frequency modulation system operating on the principles of the circuit of FIGURE 1. Referring to FIGURE 2, the amplifier portion of the system comprises three transistor stages including, respectively, the transistors 1A, 2A and 3A. These stages are as known per se and require little description here. The first stage, including transistor 1A, is an emitter-follower stage giving a high value of input impedance. The second stage, including transistor 2A, is an amplitude limiting stage. The third stage is a resonant tuned stage with a resonant frequency determined by the values of the inductance 4A and the condenser 5A in the emitter circuit of the transistor 3A. Modulated output is taken off from the collector of transistor 3A at the output terminal O and is also fed to a feedabck path constituted by a Wien bridge network.

The Wien bridge network consists of the resistance R1 and condenser C1 (corresponding to the similarly referenced elements in FIGURE 1) in the series arm and the condenser C2 (corresponding to condenser C2 of FIGURE 1) and the resistances 1R2, 2R2, 3R2 and 4R2 in the shunt arm. The total effective resistance value in the shunt arm is controlled by the modulating signals by means of three transistors T1, T2 and T3. When the modulating signal applied at terminal M reaches its negative limit, transistor T1 conducts and transistors T2 and T3 are cut off. In this condition the effective shunt arm resistance is of maximum value being that presented by the two resistance branches in parallel, one consisting of resistances 1R2 and 2R2 in series and the other consisting of resistances 3R2 and 4R2 in series. The output frequency at O is accordingly at its lower limiting value. When the modulating input signal reaches its positive limit, transistor T1 cuts off and transistors T2 and T3 conduct. Transistor T2 accordingly shunts resistance 1R2 and transistor T3 shunts resistance 4R2 and the effective shunt arm resistance is now substantially that of the resistances 2R2 and 3R2 in parallel. The output frequency at O is now accordingly at its higher limiting value. It will be observed that the modulating circuit is of a balanced form so that the D.C. voltage at the base of the transistor 1A is substantially constant over the modulation cycle.

The potentiometer P1 serves for input balance adjustment; the variable resistance 6A in the circuit of the transistor 3A of the amplifier is a "set shift" adjustment resistance; and adjustment of the variable inductance 4A of course adjusts the resonant frequency of the amplifier. These three adjustments are pre-set.

In a practical embodiment as shown in FIGURE 2 designed for operation at 3.4 kc./s. with a frequency shift of 85 c./s., the various circuit elements were dimensioned as indicated in the figure, the amplifier gain being about eight times. The frequency stability of the system is virtually that of the tuned circuit in the amplifier.

In cases in which a wide frequency shift is required and in cases in which the modulation system is to be applied to a low frequency carrier telegraph channel it is preferable to design the said modulation system for operation at a higher frequency than that ultimately required and to beat down the modulated output to the required lower frequency by means of a heterodyne frequency changer.

I claim:

1. A frequency modulation system comprising a resonant tuned amplifier and a phase shifting feedback path connected across said amplifier, the amplifier having a gain such that it generates sustained oscillations by virtue of said feedback path, and said feedback path comprising a Wien bridge network having a modulating-signal-controlled variable impedance in a shunt arm thereof, said variable impedance varying the phase shift introduced by said feedback path to vary between predetermined limits the frequency of said oscillations.

2. A system as claimed in claim 1 wherein the resonant tuned frequency of the amplifier is mid-way between the two limiting frequencies.

3. A system as claimed in claim 1 wherein the phase shift introduced by said feedback path is substantially zero at the frequency at which the amplifier is resonant.

4. A system as claimed in claim 1 wherein the variable impedance is a resistance network comprising resistance elements and associated switching transistors, and means responsive to the modulating signals for selectively controlling the conductivities of said switching transistors to control to one or other of two predetermined values the overall resistance presented by the said resistance network.

5. A system as claimed in claim 1 wherein the amplifier includes an emitter follower transistor stage, an amplitude limiting transistor stage and a resonant tuned transistor stage tuned by inductance and capacitance means.

6. A frequency modulation system comprising a resonant tuned amplifier with an input and an output, said amplifier having a phase shifting feedback path connected between said input and said output, said amplifier further having a gain such that the amplifier generates sustained oscillations by virtue of said feedback path, said feedback path comprising a Wien bridge network, and means for controlling the amount of phase shift introduced by said feedback path between one and another of two values, at one of which the total phase shift around the loop formed by the amplifier and the feedback path is 360° at one predetermined limiting frequency of said oscillations and at the other of which values said total phase shift is 360° at another predetermined limiting frequency of said oscillations, said phase shift controlling means comprising a modulating-signal-controlled variable impedance connected in a shunt arm of said Wien bridge network.

7. A frequency modulation system comprising a resonant tuned amplifier; input means for said amplifier; output means; said amplifier having a gain operative to cause circuit connected between said input means and said output means; said amplifier having a gain operative to cause the amplifier and feedback circuit to generate sustained oscillations; said feedback circuit comprising a Wien bridge network having modulated-signal-controlled variable impedance means, connected in a shunt arm thereof, for varying the amount of phase shift introduced by said feedback circuit to vary between predetermined limits the frequency of said sustained oscillations.

References Cited by the Examiner

UNITED STATES PATENTS

| | | | |
|---|---|---|---|
| 2,217,778 | 10/1940 | Usselman | 332—27 |
| 2,435,808 | 2/1948 | Usselman | 332—27 |

ROY LAKE, *Primary Examiner.*